(12) United States Patent
Ye et al.

(10) Patent No.: US 12,323,546 B2
(45) Date of Patent: Jun. 3, 2025

(54) COMMUNICATION SERVICE STATUS CONTROL METHOD, TERMINAL DEVICE, AND READABLE STORAGE MEDIUM

(71) Applicant: Honor Device Co., Ltd., Shenzhen (CN)

(72) Inventors: Fei Ye, Shenzhen (CN); Yunfei Qi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 362 days.

(21) Appl. No.: 17/905,594

(22) PCT Filed: Oct. 22, 2021

(86) PCT No.: PCT/CN2021/125877
§ 371 (c)(1),
(2) Date: Sep. 2, 2022

(87) PCT Pub. No.: WO2022/042770
PCT Pub. Date: Mar. 3, 2022

(65) Prior Publication Data
US 2023/0117194 A1    Apr. 20, 2023

(30) Foreign Application Priority Data

Aug. 25, 2020   (CN) .......................... 202010863763.4

(51) Int. Cl.
*H04M 1/72412*    (2021.01)
*H04W 4/80*    (2018.01)

(52) U.S. Cl.
CPC ......... *H04M 1/72412* (2021.01); *H04W 4/80* (2018.02)

(58) Field of Classification Search
CPC ............... H04W 4/80; H04M 1/72412; H04M 2250/02; H04M 2250/04
See application file for complete search history.

(56) References Cited

U.S. PATENT DOCUMENTS

| | | |
|---|---|---|
| 10,123,276 B2 | 11/2018 | Visuri et al. |
| 2017/0034368 A1* | 2/2017 | Mihira .................. G06F 3/1292 |
| 2018/0124847 A1* | 5/2018 | Nishida ................. H04W 8/005 |

FOREIGN PATENT DOCUMENTS

| | | |
|---|---|---|
| CN | 107113728 A | 8/2017 |
| CN | 108377458 A | 8/2018 |

* cited by examiner

*Primary Examiner* — Tuan H Nguyen
(74) *Attorney, Agent, or Firm* — Slater Matsil, LLP

(57) ABSTRACT

Embodiments of this application disclose a communication service status control method, a terminal device, and a computer-readable storage medium. The method includes: If it is detected that a preset trigger condition is met, enabling a first communication service corresponding to a target service, and displaying a status of a switch control of the first communication service as a first state, where the first state is used to describe that the first communication service is in an enabled state; and if a first operation for the switch control is detected and it is detected that a target service is in a running state, displaying a status of a switch control of a second communication service as a second state, and maintaining the second communication service in an enabled state, where the second state is used to describe that the second communication service is in a disabled state.

20 Claims, 9 Drawing Sheets

COMMUNICATION SERVICE STATUS CONTROL METHOD, TERMINAL DEVICE, AND READABLE STORAGE MEDIUM

CROSS-REFERENCE TO RELATED APPLICATIONS

This application is a national stage of International Application No. PCT/CN2021/125877, filed on Oct. 22, 2021, which claims priority to Chinese Patent Application No. 202010863763.4, filed on Aug. 25, 2020. Both of the aforementioned applications are hereby incorporated by reference in their entireties.

TECHNICAL FIELD

This application relates to the field of terminal technologies, and in particular, to a communication service status control method, a terminal device, and a computer-readable storage medium.

BACKGROUND

With continuous development of electronic technologies, near field interconnection services between terminal devices are also increasing.

A near field interconnection service between terminal devices is generally implemented based on underlying communication services such as Bluetooth, Wi-Fi, and near field communication (near field communication, NFC). For example, a near field interconnection service like wireless projection needs to rely on a Wi-Fi communication service of a terminal device.

Generally, one or at least two underlying communication services are required for an interconnection service between terminal devices. However, a user generally does not understand an implementation principle of an interconnection service, and further does not know which underlying communication services need to be enabled for a specific interconnection service. Consequently, a use threshold for the interconnection service is relatively high. In addition, in a process of using an interconnection service, if a user disables a specific underlying communication service, the interconnection service is unavailable.

SUMMARY

Embodiments of this application provide a communication service status control method, a terminal device, and a computer-readable storage medium, which can improve use stability of an interconnection service and reduce a use threshold.

According to a first aspect, an embodiment of this application provides a communication service status control method, where the method is applied to a first terminal device, and the first terminal device may be, for example, a portable terminal device such as a mobile phone and a tablet computer. The method may include: if it is detected that a preset trigger condition is met, enabling a first communication service corresponding to a target service, and displaying a status of a switch control of the first communication service as a first state, where the first communication service is a communication service required for implementing the target service, and the first state is used to describe that the first communication service is in an enabled state; and if a first operation for a switch control is detected and it is detected that the target service is in a running state, in response to the first operation, displaying a status of a switch control of a second communication service as a second state, and maintaining the second communication service in an enabled state, where the first operation is used to indicate to disable the second communication service, the second communication service is one or more communication services in the first communication service, and the second state is used to describe that the second communication service is in a disabled state.

In this embodiment of this application, if the preset trigger condition is met, a communication service required for implementing the target service is automatically enabled, and a user does not need to enable the required communication service manually. In this way, the user does not need to know which underlying communication services need to be enabled for a specific interconnection service, thereby reducing a use threshold for the interconnection service. In addition, when an operation that is used to disable the target communication service is detected and there is a target service at an upper layer at a current moment, an upper-layer switch control of the communication service is displayed as an off state. However, the target communication service at an underlying layer is not disabled, and continues to maintain an enabled state to ensure availability of the target service. In this way, even if the user turns off the upper-layer switch control of the communication service for some reason (for example, accidentally) in a service use process, the communication service at the underlying layer is not disabled, thereby ensuring stability of the interconnection service.

For example, the first terminal device is a mobile phone, and the target service is "OneHop head unit connection", that is, the mobile phone touches the head unit, to connect the mobile phone to the head unit. When a touch between the mobile phone and the head unit is detected by using NFC enabled on the mobile phone, the preset trigger condition is thought to be met for the mobile phone, and the mobile phone automatically enables a first communication service corresponding to the target service. In this case, the first communication service includes Wi-Fi and Bluetooth, that is, the mobile phone automatically enables Wi-Fi and Bluetooth. In addition, the mobile phone displays switches of Wi-Fi and Bluetooth as an enabled state. In a process of using the target service, if the user accidentally turns off a Wi-Fi button at the upper layer but the mobile phone detects that there is a "OneHop head unit connection" service at the upper layer, the Wi-Fi button at the upper layer is displayed as an off state, but the Wi-Fi communication service at the underlying layer is maintained in an enabled state. In this way, even if the Wi-Fi button at the upper layer is displayed as an off state, the interconnection service "OneHop head unit connection" is still available.

In some possible implementations of the first aspect, the foregoing first communication service may include at least one of the following: Bluetooth, Wi-Fi, and near field communication NFC.

In some possible implementations of the first aspect, the foregoing process of detecting whether a preset trigger condition is met may include: detecting whether there is a touch with a second terminal device; and determining that the preset trigger condition is met when it is detected that there is a touch with the second terminal.

Further, in some possible implementations of the first aspect, the foregoing process of detecting whether there is a touch with a second terminal device may include: detecting a distance from the second terminal device; enabling NFC to generate an NFC radio frequency field when the distance is less than a preset distance; detecting residence time of an NFC tag in the NFC radio frequency field, where the second terminal device includes the NFC tag; and determining that there is a touch with the second terminal device when the residence time is greater than a preset time threshold.

For example, for some target services without definite switches, the first terminal device may detect a distance between two devices in a Bluetooth micro-distance manner. When the distance is less than the preset distance, NFC is automatically enabled, and that whether there is a touch is detected by using NFC.

In some possible implementations of the first aspect, the foregoing process of enabling a first communication service corresponding to a target service may include: obtaining device information of the second terminal device through a communication channel, where the communication channel is a connection channel between the first terminal device and the second terminal device; determining the target service based on the device information; determining the first communication service associated with the target service; and enabling the first communication service.

In this implementation, for some target services without definite switches, the first terminal device may identify a current service scenario based on device information of a peer device, and determine a target service that needs to be enabled based on the service scenario, so that a required communication service is enabled based on the service scenario, and user experience is improved.

For example, the foregoing communication channel is an NFC channel. In this case, the first terminal device is a mobile phone, and the second terminal device is a laptop. The mobile phone touches an NFC tag on the laptop, and the mobile phone may determine that a current service is a multi-screen coordination service by reading device information, further determine that a communication service required by the multi-screen collaboration service is Wi-Fi, and then automatically enable Wi-Fi.

In some possible implementations of the first aspect, the foregoing process of detecting whether a preset trigger condition is met may include: if a second operation is detected, determining that the preset trigger condition is met, where the second operation is used to trigger the target service.

For example, if a touch operation for a switch control of a target service (that is, a second operation) is detected, a corresponding target service is triggered.

In some possible implementations of the first aspect, the method may further include: if it is detected that the target service is not in a running state, disabling the first communication service. That is, the first terminal device dynamically disables the first communication service of the target service.

In some possible implementations of the first aspect, the method may further include: when the target service is triggered for the first time, displaying a first interface, where the first interface includes prompt information, and the prompt information is used to prompt a user whether to keep a communication service in an enabled state when a switch control is in the first state.

According to a second aspect, an embodiment of this application provides a communication service status control apparatus, where the apparatus is applied to a first terminal device, and the apparatus may include:

a first control module, configured to: if it is detected that a preset trigger condition is met, enable a first communication service corresponding to a target service, and display a status of a switch control of the first communication service as a first state, where the first communication service is a communication service required for implementing the target service, and the first state is used to describe that the first communication service is in an enabled state; and a second control module, configured to: if a first operation for a switch control is detected and it is detected that the target service is in a running state, in response to the first operation, display a status of a switch control of a second communication service as a second state, and maintain the second communication service in an enabled state, where the first operation is used to indicate to disable the second communication service, the second communication service is one or more communication services in the first communication service, and the second state is used to describe that the second communication service is in a disabled state.

In some possible implementations of the second aspect, the first communication service includes at least one of the following: Bluetooth, Wi-Fi, and near field communication NFC.

In some possible implementations of the second aspect, the foregoing first control module is specifically configured to detect whether there is a touch with the second terminal device, and determine that the preset trigger condition is met when a touch with the second terminal is detected.

In some possible implementations of the second aspect, the foregoing first control module is specifically configured to: detect a distance from the second terminal device; enable NFC to generate an NFC radio frequency field when the distance is less than a preset distance; detect residence time of an NFC tag in the NFC radio frequency field, where the second terminal device includes the NFC tag; and determine that there is a touch with the second terminal device when the residence time is greater than a preset time threshold.

In some possible implementations of the second aspect, the foregoing first control module is specifically configured to: obtain device information of the second terminal device through a communication channel, where the communication channel is a connection channel between the first terminal device and the second terminal device; determine the target service based on the device information; determine the first communication service associated with the target service; and enable the first communication service.

In some possible implementations of the second aspect, the foregoing first control module is specifically configured to: if a second operation is detected, determine that the preset trigger condition is met, where the second operation is used to trigger the target service.

In some possible implementations of the second aspect, the apparatus may further include a communication service disabling module, configured to: if it is detected that the target service is not in a running state, disable the first communication service.

In some possible implementations of the second aspect, the apparatus may further include a prompting module, configured to: display a first interface when the target service is triggered for the first time, where the first interface includes prompt information, and the prompt information is used to prompt the user whether to keep the communication service in an enabled state when the switch control is in the first state.

The foregoing communication service status control apparatus has a function of implementing the foregoing communication service status control method. The function may be implemented by using hardware, or may be implemented by executing corresponding software by hardware.

The hardware or software includes one or more modules corresponding to the foregoing function. The module may be software and/or hardware.

According to a third aspect, an embodiment of this application provides a terminal device, including a memory, a processor, and a computer program that is stored in the memory and can run on the processor, where the processor implements the method according to any one of the foregoing first aspect when executing the computer program.

According to a fourth aspect, an embodiment of this application provides a computer-readable storage medium, where the computer-readable storage medium stores a computer program, and when the computer program is executed by a processor, the method according to any one of the foregoing first aspect is implemented.

According to a fifth aspect, an embodiment of this application provides a device control system, where the system may include a first rich device and at least one second rich device, and the first rich device is connected to the second rich device in communication. The first rich device is configured to execute the method in the first aspect, and the second rich device is configured to execute the method in the second aspect.

According to a sixth aspect, an embodiment of this application provides a chip system, where the chip system includes a processor, where the processor is coupled to a memory, and the processor executes a computer program stored in the memory, so as to implement the method according to any one of the first aspect. The chip system may be a single chip or a chip module including a plurality of chips.

According to a seventh aspect, an embodiment of this application provides a computer program product. When the computer program product runs on a terminal device, the terminal device performs the method according to any one of the first aspect.

It may be understood that for beneficial effects of the second aspect to the seventh aspect, reference may be made to related descriptions in the first aspect, and details are not described herein again.

DETAILED DESCRIPTION OF ILLUSTRATIVE EMBODIMENTS

In the following descriptions, for describing but not limiting, specific details such as a specific system structure and technology are proposed, so as to enable embodiments of this application to be thoroughly understood.

In embodiments of this application, a terminal device may automatically enable or disable an underlying communication service based on a running status of an upper-layer interconnection service, that is, the underlying communication service of the terminal device may dynamically respond to the upper-layer interconnection service. When there is an interconnection service at the upper layer, an underlying communication service required by the interconnection service is automatically enabled; when there is no interconnection service at the upper layer, a corresponding underlying communication service is automatically disabled. In this way, when a user needs to use a specific interconnection service, the user does not need to understand an implementation principle of the interconnection service or to know which underlying communication services are required for implementing the interconnection service, thereby reducing a use threshold for the interconnection service.

Figure 1:
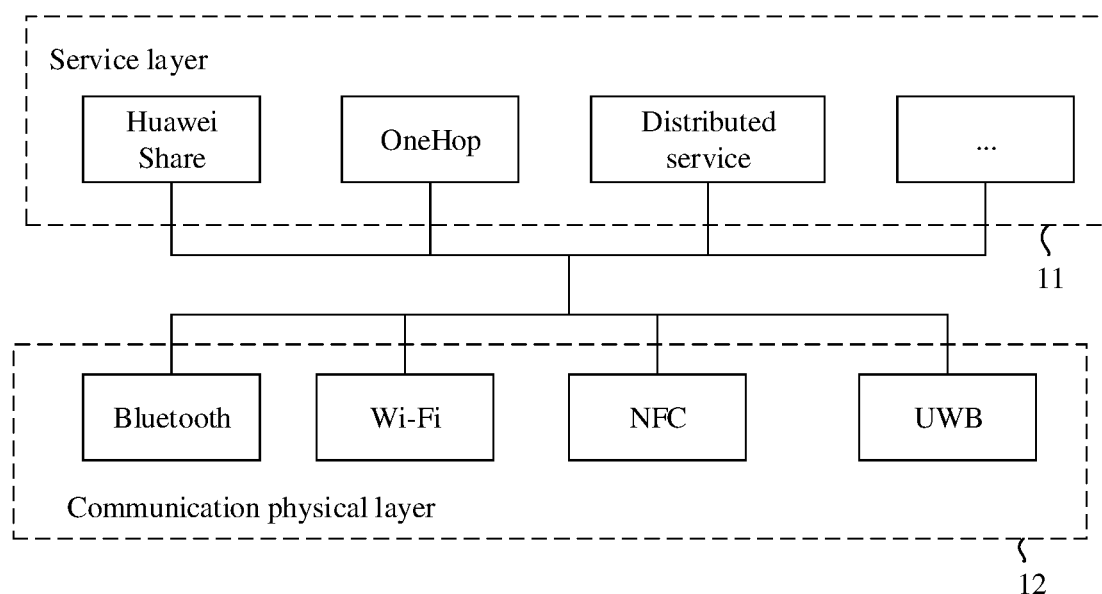
FIG. 1 is a schematic diagram of a device control system according to an embodiment of this application.

An underlying layer corresponding to the underlying communication service generally refers to a communication physical layer, and an upper layer corresponding to the upper-layer interconnection service generally refers to a service layer or an application layer. For example, refer to a schematic diagram of a service layer and a communication physical layer shown in FIG. 1. As shown in FIG. 1, the service layer 11 may include "Huawei Share", "OneHop", a distributed service, and the like, and the communication physical layer 12 may include short-distance wireless communication services such as Bluetooth, Wi-Fi, NFC, and ultra wide band (ultra wide band, UWB). Bluetooth may include classic Bluetooth and Bluetooth low energy. The distributed service may be a distributed graphics library, and communication services required by the distributed graphics library are Bluetooth and Wi-Fi.

An implementation principle of each interconnection service is different, and a required underlying communication service may also be different correspondingly. For example, when "OneHop" in FIG. 1 is specifically "OneHop head unit connection", a mobile phone enables an NFC communication service and touches an active NFC tag of a head unit to perform device authentication. Then, the mobile phone and the head unit are paired and connected by using Bluetooth. After a Bluetooth connection between the mobile phone and the head unit is established, information required for a Wi-Fi point-to-point connection is transmitted through the Bluetooth connection, so as to establish the Wi-Fi point-to-point connection, thereby implementing projection from the mobile phone to the head unit. It can be learned from the foregoing that in the interconnection service "OneHop head unit connection", the required underlying communication services are NFC, Bluetooth, and Wi-Fi.

In the prior art, if a user needs to use "OneHop head unit connection", the user needs to understand an implementation principle of the interconnection service, and then know that NFC, Bluetooth, and Wi-Fi on the mobile phone need to be enabled. However, in embodiments of this application, when it is detected that "OneHop head unit connection"

needs to be triggered, the mobile phone automatically enables the underlying communication services required for implementing the interconnection service, that is, the mobile phone automatically enables NFC, Bluetooth, and Wi-Fi. It can be easily seen that in the prior art, a user needs to understand an implementation principle of an interconnection service and know which underlying communication services are required, and a use threshold is relatively high. However, in embodiments of this application, the required communication services are automatically enabled based on a running status of the interconnection service, and a use threshold is relatively low.

For another example, an implementation principle of "Huawei Share" may be that two mobile phones perform device discovery by using Bluetooth, and perform data transmission through a Wi-Fi point-to-point connection. Therefore, underlying communication services required by "Huawei Share" are Bluetooth and Wi-Fi.

The foregoing "Huawei Share" and "OneHop head unit connection" require two or more underlying communication services. Certainly, some interconnection services may need only one underlying communication service. For example, "wireless projection" may be implemented relying on only Wi-Fi.

It should be noted that an underlying communication service required by an interconnection service is not fixed, but depends on a specific implementation principle of the interconnection service. That is, an underlying communication service required by a same interconnection service is not fixed. If a specific implementation principle or an implementation process is different, a required underlying communication service may also be different. For example, for "wireless projection", device discovery and device connection are both implemented by using Wi-Fi. In this case, a required communication service is merely Wi-Fi. However, in some cases, for "wireless projection", device discovery is first performed by using Bluetooth, and then a Wi-Fi point-to-point connection is established by using Bluetooth. In this case, communication services required by "wireless projection" are Bluetooth and Wi-Fi. Alternatively, in "wireless projection", an NFC connection is first established, and then data is transmitted through a Wi-Fi point-to-point connection. In this case, communication services required by "wireless projection" are NFC and Wi-Fi.

Therefore, types of interconnection services and communication services required by interconnection services mentioned in embodiments of this application are merely examples, and do not constitute a limitation on communication services required by interconnection services.

In addition, in a process of using an interconnection service, a user may disable a specific communication service for some reason, causing the interconnection service to be unavailable. For example, in a process of using "Huawei Share", a user turns off a Wi-Fi or Bluetooth upper-layer switch button due to carelessness or little understanding of a specific implementation principle of the interconnection service. As a result, "Huawei Share" is disabled synchronously, and "Huawei Share" is unavailable. That is, availability of an interconnection service is strongly coupled to a communication service, and turning off an upper-layer switch button of an underlying communication service causes unavailability of the interconnection service. In this way, stability of the interconnection service is poor.

To improve stability of the interconnection service, in this embodiment of this application, when a disabling operation by the user is detected, whether there is an interconnection service at an upper layer is first detected. If there is an interconnection service, the switch control at the upper layer may be displayed as an off state, but the underlying communication service is not disabled, so as to ensure availability of the interconnection service.

Figure 2:
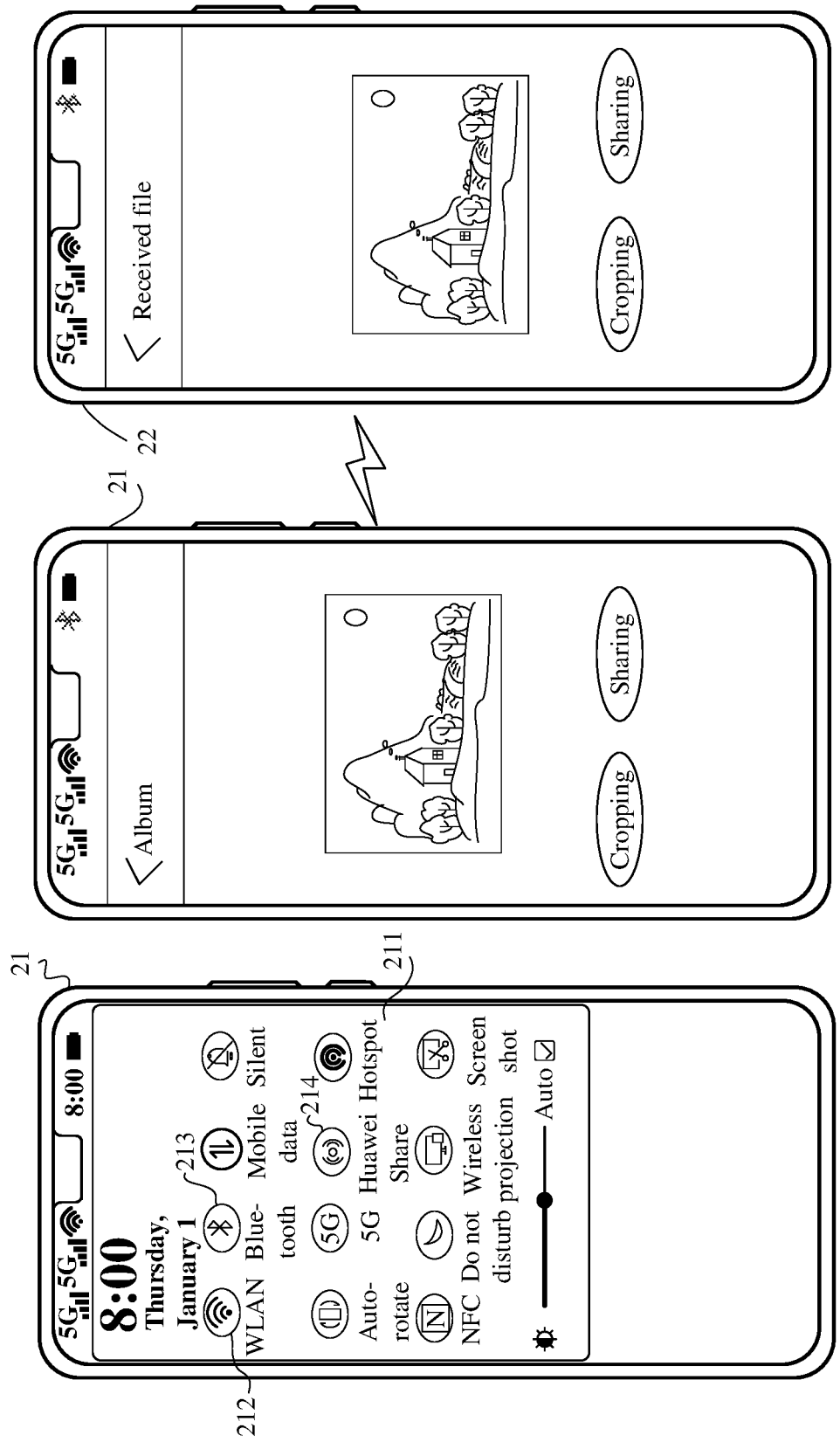
FIG. 2 is a schematic diagram of an interconnection service according to an embodiment of this application.

For example, FIG. 2 shows a schematic diagram of an interconnection service according to an embodiment of this application. In this case, the interconnection service is "Huawei Share", and communication services required by the interconnection service are Wi-Fi and Bluetooth. As shown in FIG. 2, a mobile phone 21 is synchronizing a picture to a mobile phone 22 by using "Huawei Share". In this case, Wi-Fi and Bluetooth are enabled in both the mobile phone 21 and the mobile phone 22. In a pull-down status bar interface 211 of the mobile phone 21, a switch control 212 of Wi-Fi, a switch control 213 of Bluetooth, and a switch control 214 of "Huawei Share" are all displayed as an enabled state. At a specific moment, a user taps the switch control 212 of Wi-Fi in the pull-down status bar interface 211 to disable Wi-Fi of the mobile phone 21.

In the prior art, in response to the operation performed by the user for the switch control 212, the mobile phone 21 may display a status of the switch control 212 as an off state, and disable a Wi-Fi communication service at the underlying layer. Disabling the Wi-Fi communication service may be specifically powering a Wi-Fi chip off. The Wi-Fi communication service at the underlying layer is disabled, causing the picture synchronization process to cease.

However, in this embodiment of this application, after receiving the operation for the switch control 212, the mobile phone 21 may detect whether there is a picture sharing service at the upper layer. If yes, the mobile phone 21 displays the status of the switch control 212 as an off state, but does not disable the Wi-Fi communication service at the underlying layer, and continues to maintain the underlying Wi-Fi communication service in an enabled state. In this way, a picture sharing process between the mobile phone 21 and the mobile phone 22 is not interrupted.

That is, even if the user turns off the Wi-Fi switch in the pull-down status bar interface 211, the mobile phone 21 does not disable the underlying Wi-Fi communication service if it detects that there is a related service at the upper layer. In this way, a situation that the Wi-Fi switch at the upper layer is turned off due to an unintentional operation of the user or the like and consequently the interconnection service is unavailable may be avoided as far as possible, thereby improving stability of the interconnection service.

It should be noted that an interconnection service may have a definite switch, for example, the switch control 214 of "Huawei Share" in the pull-down status bar interface in FIG. 2, that is, the switch control 214 is a switch of "Huawei Share", and "Huawei Share" may be enabled or disabled by using the switch. Certainly, an interconnection service may not have a definite switch, that is, no separate switch is used to enable or disable the interconnection service.

For an interconnection service with a definite switch, the interconnection service may be triggered by using the switch of the interconnection service. For example, the interconnection service "Huawei Share" is triggered by tapping the switch control 214.

Certainly, a method for triggering an interconnection service with a definite switch is not limited to triggering it by using a switch button of the interconnection service. For example, the user may trigger "Huawei Share" by tapping a "share" button in the album interface of the mobile phone 21. In this way, the user does not need to trigger the interconnection service by tapping the "Huawei Share" switch button 214.

Figure 3:
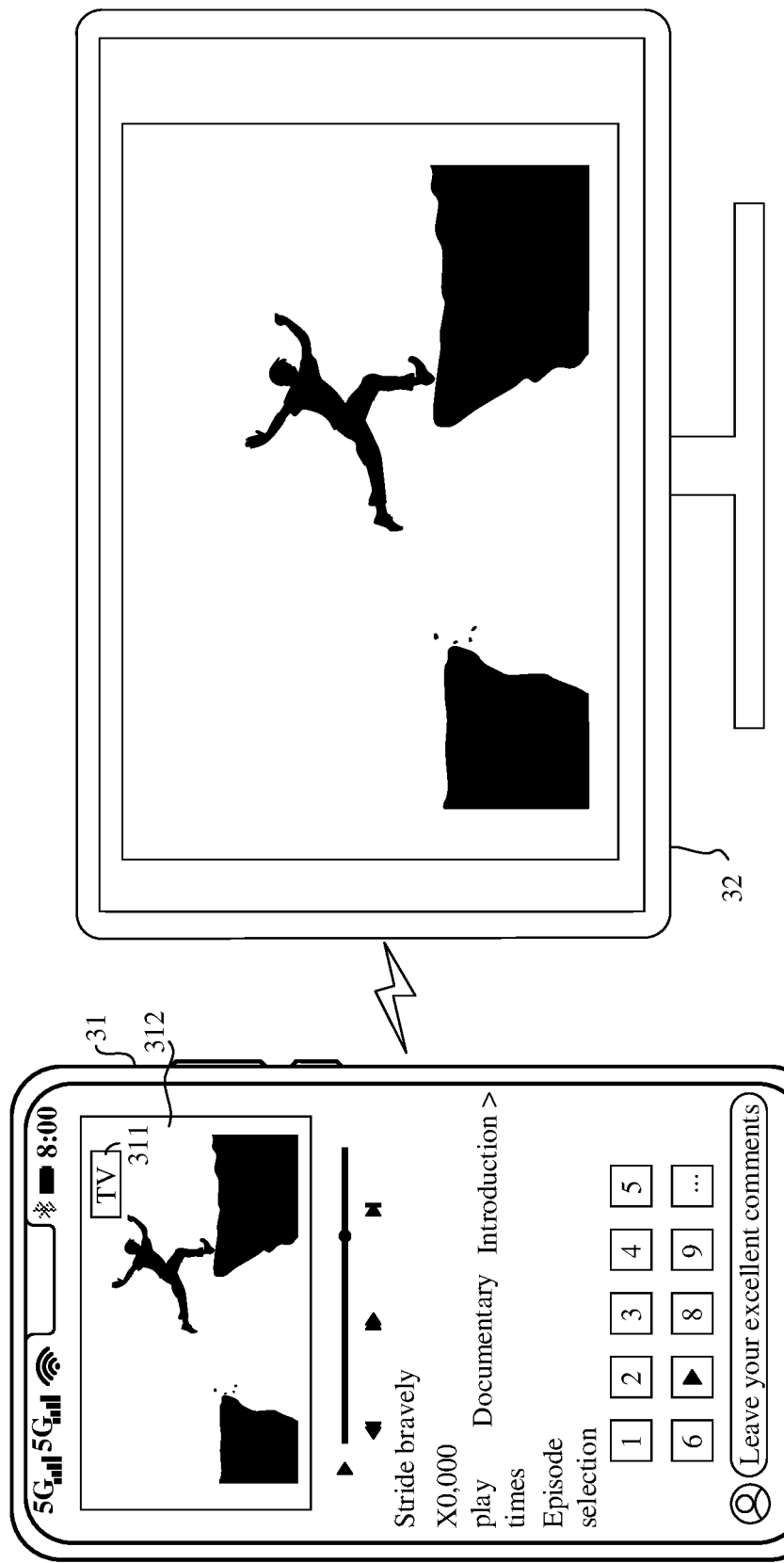
FIG. 3 is a schematic diagram of wireless projection according to an embodiment of this application.

For another example, referring to a schematic diagram of wireless projection according to an embodiment of this application shown in FIG. 3, as shown in FIG. 3, a mobile phone 31 may trigger a wireless projection service by tapping a projection button 311. After receiving an operation performed by a user for the projection button 311, in response to the operation, the mobile phone 31 automatically determines an underlying communication service required by the wireless projection service, and automatically enables the underlying communication service. After automatically enabling the underlying communication service required by the wireless projection service, the mobile phone 31 may implement the wireless projection service by using the enabled underlying communication service, so as to project an interface 312 of the mobile phone 31 to a large screen device 32.

For an interconnection service without a definite switch, methods for triggering it can be diversified. The required communication service may be enabled associatively based on an interconnection service scenario.

The interconnection service with a definite switch means that there is a switch button of the interconnection service at the upper layer. For example, in FIG. 2, if there is a "Huawei Share" switch button 214 at the upper layer, the "Huawei Share" interconnection service is an interconnection service with a definite switch. The interconnection service without a definite switch means that there is not a switch button of the interconnection service at the upper layer.

In addition, switch buttons of the interconnection service and the communication service are not limited to switch buttons in a pull-down status bar.

It may be understood that the foregoing mentioned method for triggering the interconnection service is merely an example, and does not constitute a limitation on the method for triggering the interconnection service.

To better introduce a solution provided in the embodiments of this application, the following describes the solution with reference to attached drawings.

Figure 4:
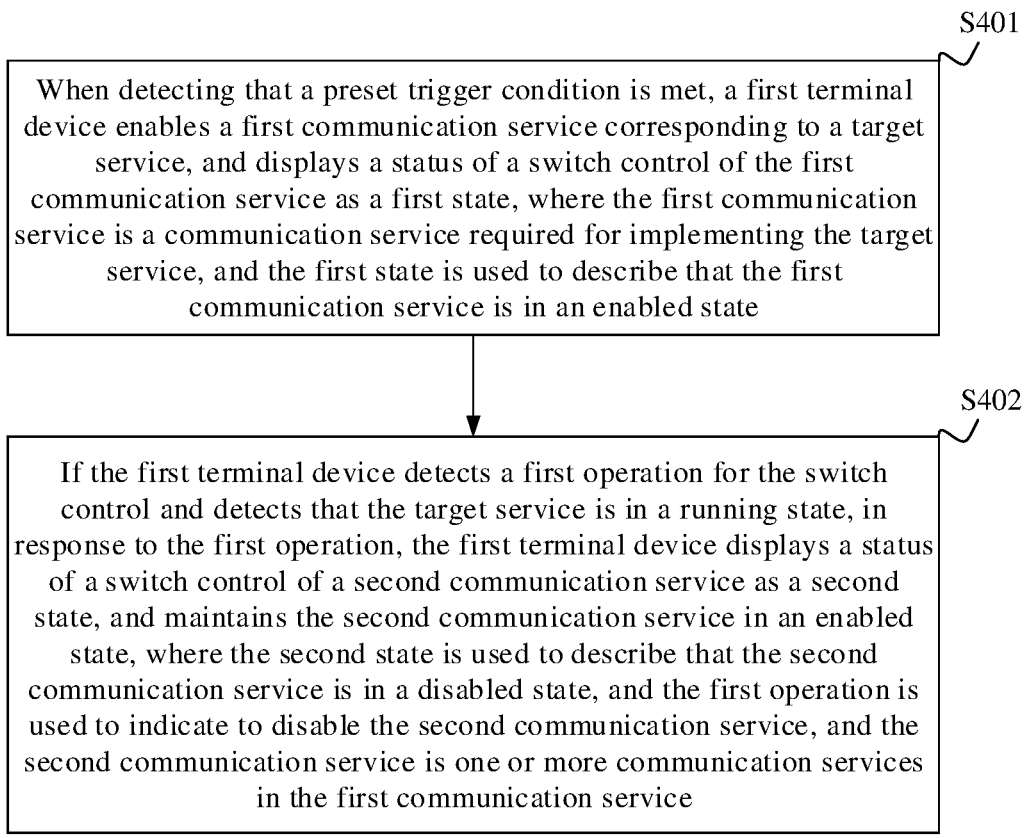
FIG. 4 is a schematic flowchart of a communication service status control method according to an embodiment of this application.

FIG. 4 is a schematic flowchart of a communication service status control method according to an embodiment of this application. The communication service status includes an enabled state and a disabled state, and controlling the communication service status means controlling the communication service to be enabled or disabled. The method may be applied to a first terminal device, and a type of the first terminal device may be arbitrary. For example, the first terminal device is a portable electronic device such as a mobile phone or a tablet computer. The method may include the following steps:

Step S401: When detecting that a preset trigger condition is met, the first terminal device enables a first communication service corresponding to a target service, and displays a status of a switch control of the first communication service as a first state, where the first communication service is a communication service required for implementing the target service, and the first state is used to describe that the first communication service is in an enabled state.

It should be noted that the foregoing preset trigger condition is a condition used to determine whether the interconnection service is triggered. When the preset trigger condition is met, it is determined that the target service needs to be triggered; or when the preset trigger condition is not met, it is determined that the target service does not need to be triggered.

Different interconnection services may have different preset trigger conditions. For an interconnection service with a definite switch, the preset trigger condition may be detecting a second operation used to trigger the target service. Generally, the second operation may refer to an operation for a switch of an interconnection service. For example, referring to FIG. 2, the second operation may be a tap operation by a user on a switch control of "Huawei Share" 214, and the tap operation is used to enable "Huawei Share".

For another example, the target service may be triggered based on a trigger manner shown in FIG. 3. For example, referring to FIG. 3, when a mobile phone 31 detects that a user taps a projection button 311, it is considered that the preset trigger condition is met, and a communication service required by a wireless projection service is automatically enabled. In addition, the target service may be triggered in another manner. For example, the user taps a "wireless projection" switch button in a pull-down status page 211 in FIG. 2 to trigger a "wireless projection" service.

For an interconnection service without a definite switch, a communication service required by the interconnection service may be enabled associatively based on a service scenario.

For example, for a service scenario in which a mobile phone is connected to a head unit, the mobile phone automatically enables Wi-Fi and Bluetooth when detecting that the mobile phone is connected to the head unit by using USB. In this case, the preset trigger condition is that the mobile phone detects that the mobile phone is connected to the head unit by using USB. The underlying communication services required by the target service are Wi-Fi and Bluetooth.

In some embodiments, whether a preset trigger condition is met may be determined by detecting whether there is a touch between a first terminal device and a second terminal device. When two terminal devices are detected to be touched, it is determined that the preset trigger condition is met; otherwise, when two terminal devices are not detected to be touched, it is determined that the preset trigger condition is not met. The second terminal device may be a target device in an interconnection service. For example, the interconnection service is a wireless projection service, the first terminal device is a mobile phone, the second terminal device is a large screen device, and the mobile phone needs to be projected to the large screen device.

Whether there is a touch between two devices may be detected by using an NFC technology. Specifically, the first terminal device enables NFC, and an NFC tag is disposed on the second terminal device. The first terminal device and the second terminal device approaches to each other. When the NFC tag enters an NFC radio frequency field of the first terminal device, residence time of the NFC tag in the NFC radio frequency field is detected. If the residence time is longer than a preset time threshold, it is considered that there is a touch between the first terminal device and the second terminal device.

Figure 5:
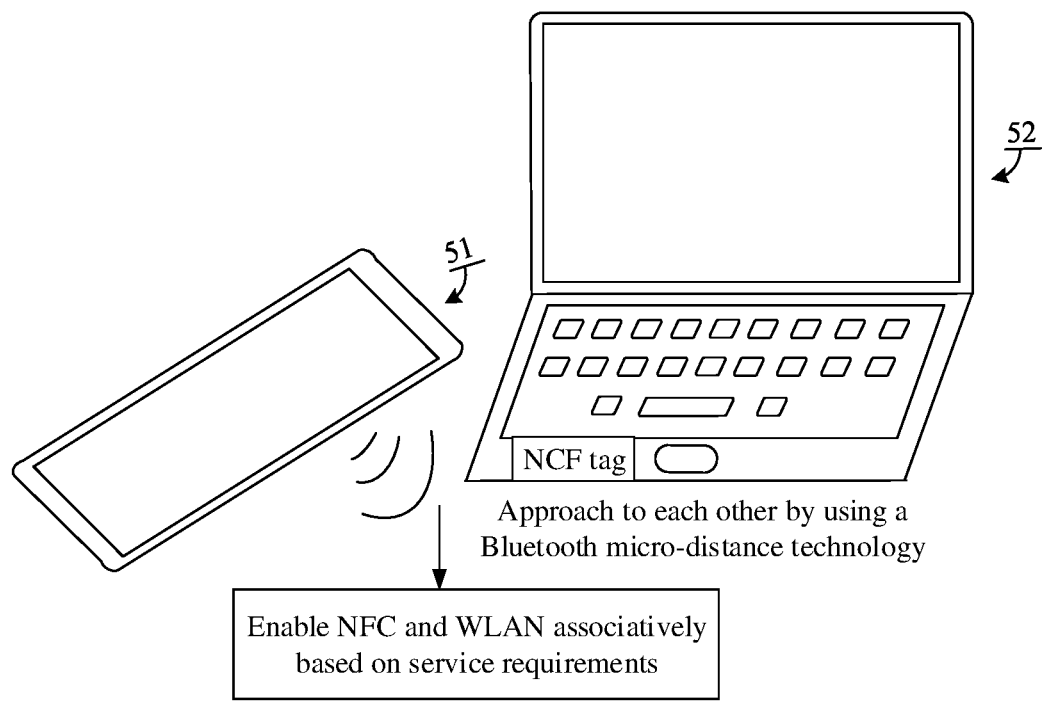
FIG. 5 is a schematic diagram of enabling a communication service required for a service scenario associatively by using Bluetooth according to an embodiment of this application.

In some other embodiments, when touch detection is performed, NFC of the first terminal device may be manually enabled, or may not be manually enabled, but may be enabled associatively by using another communication service. In a specific application, NFC may be enabled associatively based on Bluetooth. FIG. 5 shows a schematic diagram of enabling a communication service required for a service scenario associatively by using Bluetooth. As shown in FIG. 5, the first terminal device is a mobile phone 51, the second terminal device is a laptop 52, and Bluetooth is enabled on both the mobile phone 51 and the laptop 52. The mobile phone 51 and the laptop 52 may approach to each other by using a Bluetooth micro-distance technology. The mobile phone 51 may detect a distance from the laptop 52 by using Bluetooth. When the distance is less than a preset distance, an NFC function of the mobile phone is automatically enabled. After the mobile phone 51 enables the NFC function, an NFC radio frequency field is generated. Residence time of an NFC tag of the laptop 52 in the NFC radio frequency field is detected to determine whether there is a touch between the two devices.

In this case, the mobile phone 51 and the laptop 52 may perform device authentication by using associatively enabled NFC, and no user manual authentication is required, thereby improving cross-device experience.

In addition, after determining that the preset trigger condition is met, the mobile phone 51 enables Wi-Fi associatively based on the service. For example, in FIG. 5, after NFC is enabled associatively based on Bluetooth, if the mobile phone 51 determines that the target service is multi-screen coordination (that is, a wireless projection service), and determines that a communication service required by the multi-screen coordination service is Wi-Fi, the mobile phone 51 automatically enables a Wi-Fi communication service of the mobile phone 51 based on service association. After enabling Wi-Fi based on the service association, the mobile phone 51 may establish a Wi-Fi point-to-point connection to the laptop 52, and perform projection onto the laptop 52 through the Wi-Fi point-to-point connection to implement the multi-screen coordination service.

Certainly, a sensor may alternatively be used to detect whether there is a physical touch between two terminal devices.

It can be learned from the foregoing that, for an interconnection service without a definite switch, underlying communication services may cooperate with each other, so as to associatively enable a communication service required for enabling the interconnection service based on a service scenario. For example, in FIG. 5, NFC is associated with Bluetooth, and Wi-Fi is enabled based on service association.

Generally, the foregoing preset trigger condition may vary based on different interconnection services, and methods for triggering it can be diversified.

The foregoing target service refers to an interconnection service, for example, a wireless projection service. A first communication service is a communication service required for implementing the target service. For example, a communication service required for implementing a wireless projection service is Wi-Fi. In this case, the first communication service is Wi-Fi. The first communication service may include one or more communication services.

After detecting that the preset trigger condition is met, the first terminal device enables the corresponding target service, and enables the first communication service corresponding to the target service. In addition, a status of a switch control of the first communication service is displayed as the first state. By displaying the status of the switch control to the first state, the user may be notified that the first terminal device has enabled the first communication service at a current moment.

The switch control of the first communication service may be represented in any form. For example, referring to FIG. 2, in the pull-down status bar interface 211 of the mobile phone 21, a switch control of Wi-Fi 212 and a switch control of Bluetooth 213 are shown.

In a specific application, after the preset trigger condition is met, the first terminal device may first determine the target service that needs to be triggered, and then determine the first communication service corresponding to the target service based on an association relationship between the service and the communication service. Finally, the first communication service is automatically enabled.

In some embodiments, the first terminal device may determine the target service that needs to be triggered by using device information of the second terminal device. Specifically, the first terminal device may obtain the device information of the second terminal device through a first communication channel, and determine the target service abased on the device information.

Figure 6:
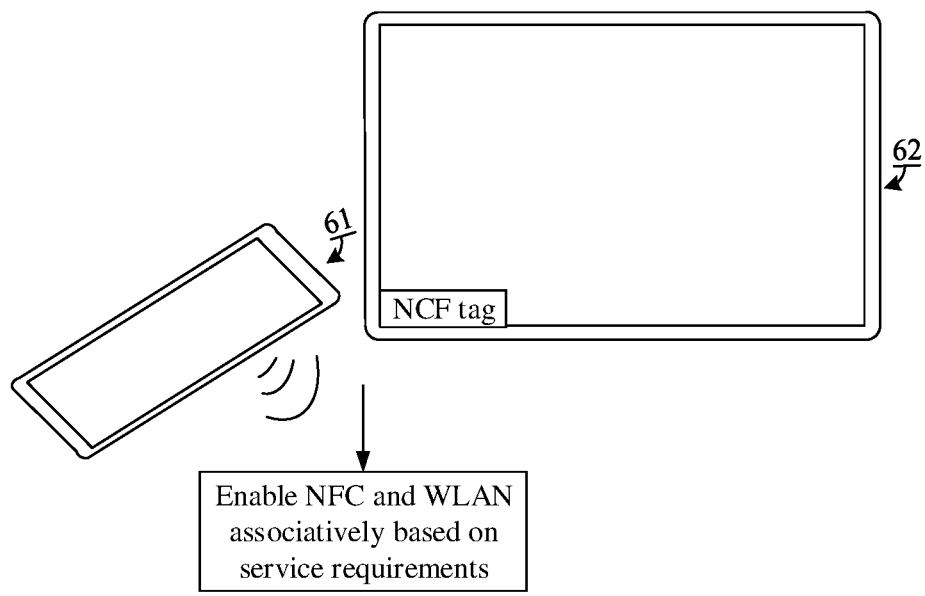
FIG. 6 is a schematic diagram of enabling associated communication services based on an NFC touch according to an embodiment of this application.

For example, refer to a schematic diagram of enabling associated communication services based on an NFC touch shown in FIG. 6. As shown in FIG. 6, an NFC function is enabled on a mobile phone 61, an NFC tag is disposed on a head unit 62, and the mobile phone 61 touches the head unit 62 by using NFC. The mobile phone 61 may read device information of the head unit 62 in the NFC tag by using NFC, and the device information may include but is not limited to information such as a device type and a device identifier. The mobile phone 61 may determine that a peer device is a head unit based on the device information, then considers that an interconnection service that needs to be triggered in this case is "OneHop head unit connection", and further confirms that communication services associated with the interconnection service are Bluetooth and Wi-Fi. That is, the mobile phone 61 may store a relationship between a device type and an interconnection service. For example, an interconnection service corresponding to a head unit is "OneHop head unit connection", and an interconnection service corresponding to a laptop is "multi-screen coordination". That is, the mobile phone 61 may determine which type of interconnection service currently needs to be triggered based on a type of a peer device.

For another example, based on FIG. 5, after the mobile phone 51 touches the laptop 52 by using NFC, the mobile phone 51 obtains device information of the laptop 52 through an NFC connection. After the mobile phone 51 determines that the peer device is a laptop based on the device information, it is considered that in this case, an interconnection service that needs to be triggered is a multi-screen coordination service.

Certainly, in some other embodiments, the first terminal device may also determine the target service that needs to be triggered based on a received trigger operation. For example, when the first terminal device receives a tap operation for the wireless projection button, it is determined that an interconnection service that needs to be triggered in this case is a wireless projection service.

It may be understood that the first terminal device may store an association relationship between an interconnection service and a communication service. By using the association relationship, the first terminal device may know which communication services are required to implement a specific interconnection service. Certainly, in a case in which the target service is determined based on device information of the second terminal device, the first terminal device may store an association relationship between device information and an interconnection service, that is, information such as a device type may be used to determine the target service that needs to be triggered. For example, when a mobile phone determines that a peer device is a head unit, it may be determined that an interconnection service that needs to be triggered in this case is "OneHop head unit connection".

Step S402: If the first terminal device detects a first operation for the switch control and detects that the target service is in a running state, in response to the first operation, the first terminal device displays a status of the switch control of the second communication service as a second state, and maintains the second communication service in an enabled state, where the second state is used to describe that the second communication service is in a disabled state. The first operation is used to indicate to disable the second communication service, and the second communication service is one or more communication services in the first communication service.

Specifically, after detecting that the preset trigger condition is met, the first terminal device automatically enables the first communication service. In this way, the first terminal device may perform the target service based on the first communication. In a process of performing the target service, the first terminal device detects the first operation for the switch control, and the first operation is used to indicate the first terminal device to disable the second communication service. For example, the first operation is a tap operation for a switch control of Wi-Fi.

That is, in a process in which the target service is performed, the user disables one or more communication services required by the target service by performing the first operation. For example, the first communication service includes Bluetooth and Wi-Fi. The user taps the switch control of Wi-Fi to perform the first operation, where the first operation is used to indicate the first terminal device to disable Wi-Fi. In this case, the second communication service is Wi-Fi.

It may be understood that the first communication service may be equivalent to the second communication service, that is, the user may disable all communication services corresponding to the target service.

When the first operation is detected, the first terminal device detects whether there is a target service at the upper layer. If there is a target service at the upper layer, that is, the target service is still in a running state, in response to the first operation, the switch control of the second communication service may be changed to the second state and continues to maintain the second communication service in a disabled state. If there is not a target service at the upper layer, in response to the first operation, the switch control of the second communication service may be changed to the second state and the first communication service or the second communication service is disabled.

For example, the first communication service includes Bluetooth and Wi-Fi, and the first operation is a tap operation performed by a user on the switch control of Wi-Fi. If the first terminal device detects that there is still a target service at the upper layer, the first terminal device displays a switch status of Wi-Fi as an off state, and continues to maintain a Wi-Fi communication service at the underlying layer in an enabled state.

It may be understood that, in a process of using an interconnection service, the user may turn off an upper-layer switch of a communication service, but if it is detected that there is a related service at the upper layer, the underlying communication service is not disabled, so as to ensure availability of the interconnection service.

In some other embodiments, when it is detected that there is no related service at the upper layer, the first terminal device automatically disables the first communication service required by the service. For example, when it is detected that the wireless projection service is ended at the upper layer, the underlying Wi-Fi communication service is automatically disabled.

Figure 7:
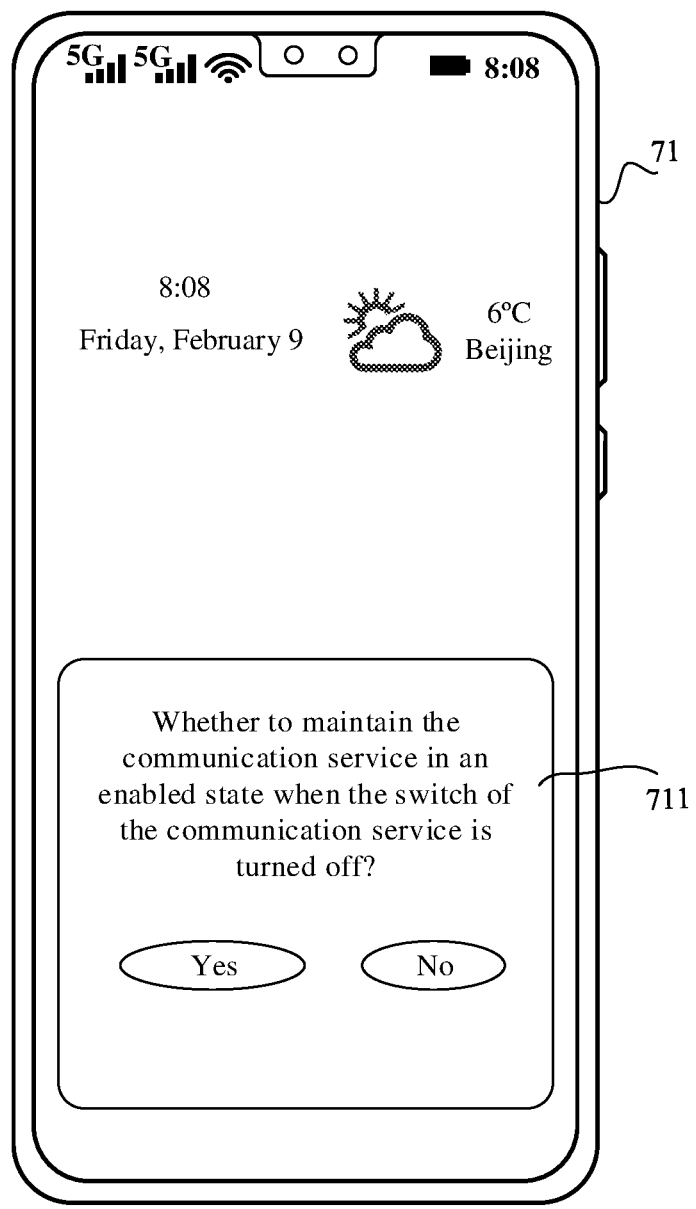
FIG. 7 is a schematic diagram of an authorization interface according to an embodiment of this application.

In some embodiments, to improve user experience, when a target service is triggered for the first time, an authorization interface may pop up to allow the user to authorize that when a switch control of a communication service is in an off state, the communication service may still maintain an enabled state. For example, refer to a schematic diagram of an authorization interface shown in FIG. 7. When a specific condition is met, an authorization interface 711 pops up on a mobile phone 71. The authorization interface includes prompt information: whether to maintain a communication service in an enabled state when a switch of the communication service is in an off state. In addition, two option buttons "Yes" and "No" are given.

In some embodiments, a plurality of interconnection services are enabled at the upper layer, and there is overlap in communication services of the plurality of interconnection services. In this case, when the user disables one of the interconnection services, the user may not disable all the communication services required by the interconnection service, but reserve communication services required by other interconnection services. For example, an interconnection service A and an interconnection service B are enabled at the upper layer. Communication services required by the interconnection service A include Wi-Fi, Bluetooth, and NFC, and a communication service required by the interconnection service B is Bluetooth. When the user disables the interconnection service A, the first terminal device detects that there is the interconnection service B at the upper layer, and the communication service of the interconnection service B is Bluetooth. In this case, only the Wi-Fi communication service and the NFC communication service at the underlying layer may be disabled, and the Bluetooth communication service is maintained in an enabled state.

It should be noted that, when an upper-layer service starts, registration is performed in a registration service list, so as to register a corresponding service into the registration service list, and carry a corresponding communication service label. When the upper-layer service is disabled, registration is also performed in the registration service list. The underlying communication service dynamically enables or disables the corresponding communication service based on the registration service list. That is, the underlying communication service may determine which communication service needs to be enabled based on the communication service label in the registration service list when the upper-layer service starts. The corresponding communication service is enabled after the determination.

Similarly, when the upper-layer service is disabled, that which communication services need to be disabled is determined by the communication service label in the registration service list, and the corresponding communication service is automatically disabled.

In a specific application, the first terminal device may determine a running status of the upper-layer service based on the registration service list. That is, it can be learned from the registration service list that whether the target service at the upper layer is in a running state or in a disabled state.

In this embodiment of this application, when it is detected that the preset trigger condition is met, the target service is enabled first, and then the underlying communication service required by the target service is automatically enabled based on the registration service list, that is, the underlying communication service required by the target service is automatically enabled. When an operation of turning off a switch control of a specific communication service is detected, the first terminal device may first determine whether the target service is in a running state based on the registration service list. If the target service is in a running state, the underlying communication service may be maintained in an enabled state by maintaining the registration service list unchanged. In addition, the switch control of the communication service is displayed as an off state. If the target service is in a disabled state, registration may be performed in the registration service list to disable the corresponding underlying communication service, that is, when it is detected that the upper-layer service is in a disabled state, the underlying communication service is automatically disabled.

Figure 8:
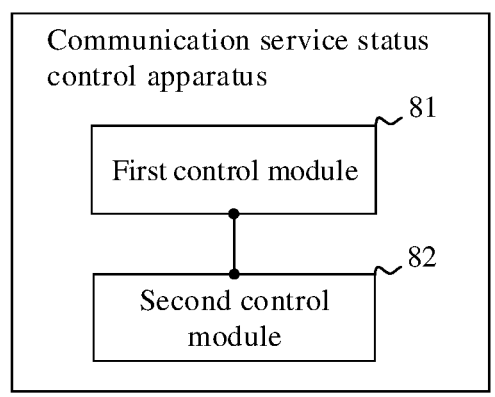
FIG. 8 is a schematic diagram of a communication service status control apparatus according to an embodiment of this application.

Corresponding to the foregoing communication service status control method, an embodiment of this application further provides a communication service status control apparatus, and the apparatus is applied to a first terminal device. Referring to a schematic diagram of a communication service status control apparatus shown in FIG. 8, the apparatus may include:

- a first control module 81, configured to: if it is detected that a preset trigger condition is met, enable a first communication service corresponding to a target service, and display a status of a switch control of the first communication service as a first state, where the first communication service is a communication service required for implementing the target service, and the first state is used to describe that the first communication service is in an enabled state; and
- a second control module 82, configured to: if a first operation for a switch control is detected and it is detected that the target service is in a running state, in response to the first operation, display a status of a switch control of the second communication service as a second state, and maintain the second communication service in an enabled state, where the first operation is used to indicate to disable the second communication service, the second communication service is one or more communication services in the first communication service, and the second state is used to describe that the second communication service is in a disabled state.

In some possible implementations, the first communication service includes at least one of the following: Bluetooth, Wi-Fi, and near field communication NFC.

In some possible implementations, the foregoing first control module is specifically configured to: detect whether there is a touch with a second terminal device, and determine that the preset trigger condition is met when a touch with the second terminal is detected.

In some possible implementations, the foregoing first control module is specifically configured to: detect a distance from the second terminal device; enable NFC to generate an NFC radio frequency field when the distance is less than a preset distance; detect residence time of an NFC tag in the NFC radio frequency field, where the second terminal device includes the NFC tag; and determine that there is a touch with the second terminal device when the residence time is greater than a preset time threshold.

In some possible implementations, the foregoing first control module is specifically configured to: obtain device information of the second terminal device through a communication channel, where the communication channel is a connection channel between the first terminal device and the second terminal device; determine the target service based on the device information; determine the first communication service associated with the target service; and enable the first communication service.

In some possible implementations, the foregoing first control module is specifically configured to: if a second operation is detected, determine that the preset trigger condition is met, where the second operation is used to trigger the target service.

In some possible implementations, the apparatus may further include a communication service disabling module, configured to disable the first communication service if it is detected that the target service is not in a running state.

In some possible implementations, the apparatus may further include a prompting module, configured to display a first interface when the target service is triggered for the first time, where the first interface includes prompt information, and the prompt information is used to prompt the user whether to keep the communication service in an enabled state when the switch control is in the first state.

The foregoing communication service status control apparatus has a function of implementing the foregoing communication service status control method. The function may be implemented by using hardware, or may be implemented by executing corresponding software by hardware. The hardware or software includes one or more modules corresponding to the foregoing function. The module may be software and/or hardware.

An embodiment of this application further provides a terminal device, which may include a memory, a processor, and a computer program that is stored in the memory and can run on the processor. The processor implements the foregoing communication service status control method when executing the computer program.

Figure 9:
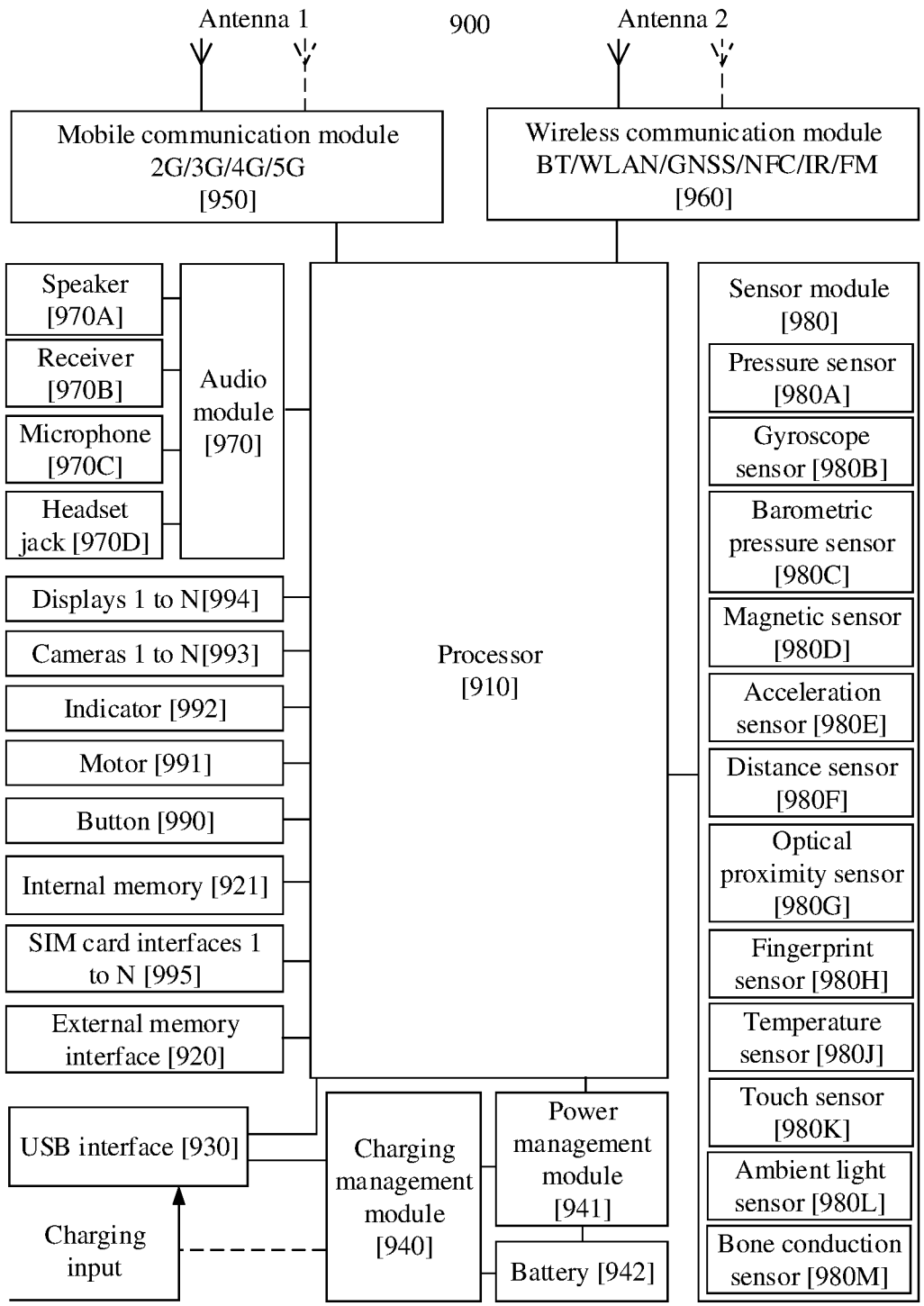
FIG. 9 is a schematic diagram of a hardware structure of an electronic device 900 according to an embodiment of this application.

A type and a specific structure of the terminal device may be arbitrary. As an example not for limitation, as shown in FIG. 9, an electronic device 900 may include a processor 910, an external memory interface 920, an internal memory 921, a universal serial bus (universal serial bus, USB) interface 930, a charging management module 940, a power management module 941, a battery 942, an antenna 1, an antenna 2, a mobile communication module 950, a wireless communication module 960, an audio module 970, a speaker 970A, a receiver 970B, a microphone 970C, a headset jack 970D, a sensor module 980, a button 990, a motor 991, an indicator 992, a camera 993, a display 994, and a subscriber identification module (subscriber identification module, SIM) card interface 995, and the like. The sensor module 980 may include a pressure sensor 980A, a gyroscope sensor 980B, a barometric pressure sensor 980C, a magnetic sensor 980D, an acceleration sensor 980E, a distance sensor 980F, an optical proximity sensor 980G, a fingerprint sensor 980H, a temperature sensor 980J, a touch sensor 980K, an ambient light sensor 980L, and a bone conduction sensor 980M.

It may be understood that the structure shown in this embodiment of this application does not constitute a specific limitation on the electronic device 900. In other embodiments of this application, the electronic device 900 may include more or fewer components than those shown in the figure, or some components may be combined, or some components may be split, or components are arranged in different manners. The illustrated components may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 900. The controller may generate an operation control signal based on an instruction operation code and a time sequence signal, to control instruction reading and instruction execution.

A memory may be disposed in the processor 910, and is configured to store an instruction and data. In some embodiments, the memory in the processor 910 is a cache memory. The memory may store an instruction or data that has just been used or is cyclically used by the processor 910. If the processor 910 needs to use the instruction or data again, the instruction or data may be directly invoked from the memory. Therefore, repeated access is avoided, a waiting time of the processor 19 is reduced, and system efficiency is improved.

In some embodiments, the processor 910 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, and/or a universal serial bus (universal serial bus, USB) interface, and the like.

The I2C interface is a two-way synchronous serial bus, including a serial data line (serial data line, SDA) and a derail clock line (derail clock line, SCL). In some embodiments, the processor 910 may include a plurality of groups of I2C buses. The processor 910 may be coupled to the touch sensor 980K, a charger, a flash, the camera 993, or the like through different I2C bus interfaces. For example, the processor 910 may be coupled to the touch sensor 980K through the I2C interface, so that the processor 910 communicates with the touch sensor 980K through the I2C bus interface, thereby implementing a touch function of the electronic device 900.

The I2S interface may be used for audio communication. In some embodiments, the processor 910 may include a plurality of groups of I2S buses. The processor 910 may be coupled to the audio module 970 through the I2S bus, to implement communication between the processor 910 and the audio module 970.

The PCM interface can also be used for audio communication, sampling, quantifying and coding analog signals. In some embodiments, the audio module 970 and the wireless communication module 960 may be coupled through a PCM bus interface. Both the I2S interface and the PCM interface can be used for audio communication.

The UART interface is a universal serial data bus used for asynchronous communication. The bus may be a bidirectional communication bus. The bus converts data to be transmitted between serial communication and parallel communication. In some embodiments, the UART interface is generally configured to connect the processor 910 to the wireless communication module 960. For example, the processor 910 communicates with a Bluetooth module in the wireless communication module 960 through the UART interface, to implement a Bluetooth function.

The MIPI interface may be configured to connect the processor 910 to a peripheral component such as the display 994 and the camera 993. The MIPI interface includes a camera serial interface (camera serial interface, CSI), a display serial interface (display serial interface, DSI), and the like. In some embodiments, the processor 910 communicates with the camera 993 through the CSI interface, to implement a photographing function of the electronic device 900. The processor 910 communicates with the display 994 through the DSI interface, to implement a display function of the electronic device 900.

The GPIO interface can be configured by using software. The GPIO interface may be configured as a control signal, or may be configured as a data signal. In some embodiments, the GPIO interface may be configured to connect the processor 910 to the camera 993, the display 994, the wireless communication module 960, the audio module 970, the sensor module 980, or the like. The GPIO interface can also be configured as the I2C interface, the I2S interface, the UART interface and the MIPI interface.

The USB interface 930 is an interface conforming to a USB standard specification, and may be specifically a Mini USB interface, a Micro USB interface, a USB Type C interface, or the like. The USB interface 930 may be configured to connect a charger to charge the electronic device 900, or may be configured to transmit data between the electronic device 900 and a peripheral device. The USB interface 930 may also be configured to connect to a headset and play audio by using the headset. The interface may be further configured to connect to another electronic device, such as an AR device.

It may be understood that an interface connection relationship between the modules that is shown in this embodiment of this application is merely an example for description, and does not constitute a limitation on the structure of the electronic device 900. In other embodiments of this application, the electronic device 900 may alternatively use an interface connection manner different from that in the foregoing embodiment, or use a combination of a plurality of interface connection manners.

The charging management module 940 is configured to receive a charging input from a charger. The charger may be a wireless charger, or may be a wired charger. In some embodiments of the wired charger, the charging management module 940 may receive charging input from the wired charger through the USB interface 930. In some embodiments of the wireless charger, the charging management module 140 may receive wireless charging input by using a wireless charging coil of the electronic device 900. While charging the battery 942, the charging management module 940 may further supply power to the electronic device by using the power management module 941.

The power management module 941 is configured to connect the battery 942, the charging management module 940 and the processor 910. The power management module 941 receives input of the battery 942 and/or the charging management module 940, and supplies power to the processor 910, the internal memory 921, the external memory, the display 994, the camera 993, and the wireless communication module 960, and the like. The power management module 941 may be further configured to monitor parameters such as a battery capacity, a battery cycle quantity, and a battery health status (leakage and impedance). In some other embodiments, the power management module 941 may also be disposed on the processor 910. In some other embodiments, the power management module 941 and the charging management module 940 may alternatively be disposed in a same component.

A wireless communication function of the electronic device 900 may be implemented through the antenna 1, the antenna 2, the mobile communication module 950, the wireless communication module 960, the modem processor, the baseband processor, and the like.

The antenna 1 and the antenna 2 are configured to transmit and receive electromagnetic wave signals. Each antenna in the electronic device 900 may be configured to cover a single or a plurality of communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 950 may provide a wireless communication solution, including 2G/3G/4G/5G or the like, that is applied to the electronic device 900. The mobile communication module 950 may include at least one filter, a switch, a power amplifier, a low noise amplifier (low noise amplifier, LNA), and the like. The mobile communication module 950 may receive an electromagnetic wave through the antenna 1, perform processing such as filtering and amplification on the received electromagnetic wave, and transmit a processed electromagnetic wave to the modem processor for demodulation. The mobile communication module 950 may further amplify a signal obtained after modulation by the modem processor, and convert the signal into an electromagnetic wave through the antenna 1 for radiation. In some embodiments, at least a part of functional modules of the mobile communication module 950 may be disposed on the processor 910. In some embodiments, at least a part of the functional modules of the mobile communication module 950 and at least a part of modules of the processor 910 may be disposed in a same component.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 970A, the receiver 970B, or the like), or displays an image or a video on the display 994. In some embodiments, the modem processor may be an independent device. In some other embodiments, the modem processor may be independent of the processor 910 and disposed in a same component with the mobile communication module 950 or other functional modules.

The wireless communication module 960 may provide a solution to wireless communication applied to the electronic device 900, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 960 may be one or more components that integrate at least one communication processing module. The wireless communication module 960 receives an electromagnetic wave over the antenna 2, performs frequency modulation and filtering processing on an electromagnetic wave signal, and sends a processed signal to the processor 19. The wireless communication module 960 may further receive a to-be-sent signal from the processor 910, perform frequency modulation and amplification on the signal, and convert the signal into an electromagnetic wave for radiation over the antenna 2.

In some embodiments, the antenna 1 of the electronic device 900 is coupled to the mobile communication module 950, and the antenna 2 is coupled to the wireless communication module 960, so that the electronic device 900 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, and/or an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation systems (satellite based augmentation systems, SBAS).

The electronic device 900 implements a display function by using the GPU, the display 994, the application processor, and the like. The GPU is a microprocessor for image processing, and is connected to the display 994 and the application processor. The GPU is configured to perform mathematical and geometric calculation and is configured to perform graphics rendering. The processor 910 may include one or more GPUs that execute program instructions to generate or change display information.

The display 994 is configured to display an image, a video, and the like. The display 994 includes a display panel. The display panel may be a liquid crystal display (liquid crystal display, LCD), an organic light-emitting diode (organic light-emitting diode, OLED), an active matrix organic light emitting diode (active-matrix organic light emitting diode, AMOLED), a flex light-emitting diode (flex light-emitting diode, FLED), a Miniled, a MicroLed, a MicrooLed, a quantum dot light emitting diode (quantum dot light emitting diodes, QLED), or the like. In some embodiments, the electronic device 900 may include one or N displays 994, where N is a positive integer greater than 1.

The electronic device 900 may implement a photographing function by using the ISP, the camera 993, the video codec, the GPU, the display 994, the application processor, and the like.

The ISP is configured to process data fed back by the camera 993. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, so as to convert the electrical signal into an image visible to the naked eyes. The ISP may further perform algorithm optimization on noise, luminance, and complexion of an image. The ISP may further optimize parameters such as exposure and color temperature of a photographing scene. In some embodiments, the ISP may be disposed on the camera 993.

The camera 993 is configured to capture a still image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 900 may include one or N cameras 993, where N is a positive integer greater than 1.

The digital signal processor is configured to process a digital signal. In addition to processing the digital image signal, the digital signal processor may further process another digital signal. For example, when the electronic device 900 performs frequency selection, the digital signal processor is configured to perform Fourier transform and the like on frequency energy.

The video codec is configured to compress or decompress a digital video. The electronic device 900 may support one or more video codecs. In this way, the electronic device 900 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 900, for example, image recognition, facial recognition, voice recognition, and text understanding.

The external memory interface 920 may be configured to connect to an external memory card, for example, a Micro SD card, to extend a storage capability of the electronic device 900. The external storage card communicates with the processor 910 through the external storage interface 920, to implement a data storage function. For example, files such as music and a video is stored in the external memory card.

The internal memory 921 may be configured to store computer-executable program code, where the computer-executable program code includes instructions. The processor 910 executes various functional applications of the electronic device 900 and data processing by running instructions stored in the internal memory 921. The internal memory 921 may include a program storage area and a data storage area. The program storage area may store an operating system, an application (for example, a sound playback function or an image playback function) required by at least one function, and the like. The data storage area may store data (for example, audio data and an address book) and the like created when the electronic device 900 is used. In addition, the internal memory 921 may include a high-speed random access memory, or may include a non-volatile memory such as at least one disk memory, a flash memory, or a universal flash storage (universal flash storage, UFS).

The electronic device 900 may implement audio functions by using the audio module 970, the speaker 970A, the receiver 970B, the microphone 970C, the headset jack 970D, the application processor, and the like. The audio functions are, for example, music playback and recording.

The audio module 970 is configured to convert digital audio information into an analog audio signal for output, and is also configured to convert an analog audio input into a digital audio signal. The audio module 970 may be further configured to encode and decode an audio signal. In some embodiments, the audio module 970 may be disposed on the processor 910, or a part of functional modules of the audio module 970 may be disposed on the processor 910.

The speaker 970A, also referred to as a "loudspeaker", is configured to convert an audio electrical signal into a sound signal. The electronic device 900 may be used to listen to music or listen to a hands-free call through the speaker 970A.

The receiver 970B, also referred to as an "earpiece", is configured to convert an audio electrical signal into a sound signal. When the electronic device 900 answers a telephone call or a voice message, the receiver 970B may be placed near a person's ear to answer the voice.

The microphone 970C, also referred to as a "mike" or a "mic", is configured to convert a sound signal into an electrical signal. When making a call or sending a voice message, the user may make a sound through a mouse near the microphone 970C, and input a sound signal to the microphone 970C. At least one microphone 970C may be disposed on the electronic device 900. In some other embodiments, two microphones 970C may be disposed on the electronic device 900, and in addition to collecting a sound signal, a noise reduction function may be implemented. In some other embodiments, three, four, or more microphones 970C may be disposed on the electronic device 900, so as to collect a sound signal, reduce noise, identify a sound source, implement a directional recording function, and the like.

The headset jack 970D is configured to connect to a wired headset. The headset jack 970D may be the USB interface 930, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 980A is configured to sense a pressure signal, and may convert the pressure signal into an electrical signal. In some embodiments, the pressure sensor 980A may be disposed on the display 994. There are many types of pressure sensors 980A, such as a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 900 determines strength of the pressure based on the change of the capacitance. When a touch operation is performed on the display 994, the electronic device 900 detects strength of the touch operation by using the pressure sensor 980A. The electronic device 900 may calculate a touch position based on a detected signal of the pressure sensor 980A. In some embodiments, touch operations that are performed at a same touch location but have different touch operation strength may correspond to different operation instructions. For example, when a touch operation whose touch operation strength is less than a first pressure threshold is performed on a Messages application icon, an instruction for viewing an SMS message is executed. When a touch operation whose touch operation strength is greater than or equal to the first pressure threshold is performed on the Messages application icon, an instruction for creating a new SMS message is executed.

The gyroscope sensor 980B may be configured to determine a motion posture of the electronic device 900. In some embodiments, angular velocities of the electronic device 900 around three axes (that is, x axis, y axis, and z axis) may be determined by using the gyroscope sensor 980B. The gyroscope sensor 980B may be configured to achieve image stabilization during shooting. For example, when a shutter is pressed, the gyroscope sensor 180B detects a jittering angle of the electronic device 900, calculates, based on the angle, a distance for which a lens module needs to compensate, and enables the lens to offset jittering of the electronic device 900 through reverse motion, so as to implement image stabilization. The gyroscope sensor 980B may be further used in a navigation scenario and a motion-controlled gaming scenario.

The barometric pressure sensor 980C is configured to measure barometric pressure. In some embodiments, the electronic device 900 calculates an altitude based on a barometric pressure value measured by the barometric pressure sensor 180C, to assist in positioning and navigation.

The magnetic sensor 980D includes a Hall effect sensor. The electronic device 900 may detect opening and closing of a flip cover by using the magnetic sensor 980D. In some embodiments, when the electronic device 900 is a flip phone, the electronic device 900 may detect opening and closing of a flip cover by using the magnetic sensor 980D. Further, a feature such as automatic unlocking upon opening of the flip cover is set based on a detected opening or closing state of the flip cover.

The acceleration sensor 980E may detect acceleration of the electronic device 900 in all directions (generally three axes). When the electronic device 900 is still, magnitude and a direction of gravity may be detected. The acceleration sensor 980E may be further configured to recognize a posture of the electronic device, and is applied to an application such as switching between landscape mode and vertical mode, and a pedometer.

The distance sensor 980F is configured to measure a distance. The electronic device 900 may measure a distance by using infrared or a laser. In some embodiments, in a photographing scenario, the electronic device 90 may use the distance sensor 980F to measure a distance to implement fast focusing.

The optical proximity sensor 980G may include, for example, a light emitting diode (LED) and a light detector, for example, a photodiode. The light emitting diode may be an infrared light emitting diode. The electronic device 900 emits infrared light by using the light emitting diode. The electronic device 900 detects infrared reflected light from a nearby object by using the photodiode. When sufficient reflected light is detected, it may be determined that there is an object near the electronic device 900. When insufficient reflected light is detected, it may be determined that there is not an object near the electronic device 900. The electronic device 900 may detect that the user holds the electronic device 900 close to an ear to make a call by using the proximity optical sensor 980G, so as to automatically turn off a screen to save power. The optical proximity sensor 980G may also be used in a smart cover mode or a pocket mode to automatically perform screen unlocking or locking.

The ambient light sensor 980L is configured to sense ambient light brightness. The electronic device 900 may adaptively adjust brightness of the display 994 based on the perceived ambient brightness. The ambient light sensor 980L may also be configured to automatically adjust a white balance during photographing. The ambient light sensor 980L may further cooperate with the optical proximity sensor 980G to detect whether the electronic device 900 is in a pocket to prevent an accidental touch.

The fingerprint sensor 980H is configured to collect a fingerprint. The electronic device 900 may implement fingerprint unlocking, application access lock, fingerprint photographing, fingerprint-based call answering, and the like by using a feature of the collected fingerprint.

The temperature sensor 980J is configured to detect a temperature. In some embodiments, the electronic device 900 executes a temperature treatment strategy based on the temperature detected by the temperature sensor 980J. For example, when a temperature reported by the temperature sensor 980J exceeds a threshold, the electronic device 900 reduces performance of the processor located near the temperature sensor 980J, so as to reduce power consumption and implement thermal protection. In some other embodiments, when the temperature is less than another threshold, the electronic device 900 heats the battery 942 to avoid abnormal shutdown of the electronic device 900 due to low temperature. In some other embodiments, when the temperature is less than another threshold, the electronic device 900 boosts the output voltage of the battery 942 to avoid abnormal shutdown due to low temperature.

The touch sensor 980K is also referred to as a "touch panel". The touch sensor 980K may be disposed on the display 994, and the touch sensor 980K and the display 994 form a touchscreen, which is also referred to as a "touch screen". The touch sensor 980K is configured to detect a touch operation performed on or near the touch sensor 980K. The touch sensor may transfer the detected touch operation to the application processor to determine a touch event type. A visual output related to a touch operation may be provided by using the display 994. In some other embodiments, the touch sensor 980K may alternatively be disposed on a surface of the electronic device 900 at a position different from a position of the display 994.

The bone conduction sensor 980M may obtain a vibration signal. In some embodiments, the bone conduction sensor 980M may obtain a vibration signal of a vibration bone of a human vocal part. The bone conduction sensor 980M may also contact a pulse of a human body and receive a blood pressure beating signal. In some embodiments, the bone conduction sensor 980M may also be disposed on the headset to form a bone conduction headset. The audio module 970 may obtain a voice signal through parsing based on the vibration signal, of the vibration bone of the vocal-cord part, that is obtained by the bone conduction sensor 980M, to implement a voice function. The application processor may parse heart rate information based on the blood pressure beat signal obtained by the bone conduction sensor 980M, to implement a heart rate detection function.

The button 990 includes a power-on button, a volume button, and the like. The button 990 may be a mechanical button. The button 990 may also be a touch-sensitive button. The electronic device 900 may receive a button input, and generate a button signal input related to user setting and function control of the electronic device 900.

The motor 991 may generate a vibration prompt. The motor 991 may be used for an incoming call vibration prompt, or may be used for touch vibration feedback. For example, a touch operation performed on different applications (for example, photographing and audio playback) may correspond to different vibration feedback effects. For touch operations performed in different areas of the display 994, the motor 991 may correspond to different vibration feedback effects. Different application scenarios (for example, a time reminder, receiving messages, an alarm clock, and a game) may also correspond to different vibration feedback effects. The touch vibration feedback effects may further support customization.

The indicator 992 may be an indicator light, configured to indicate a charging status, a power change, and further to indicate a message, a missed call, a notification, and the like.

The SIM card interface 995 is configured to connect to a SIM card. The SIM card may be inserted into the SIM card interface 995 or pulled out of the SIM card interface 995, so that the SIM card is in contact with or separated from the electronic device 900. The electronic device 900 may support one or N SIM card interfaces, where N is a positive integer greater than 1. The SIM card interface 995 may support a Nano SIM card, a Micro SIM card, a SIM card, and the like. A plurality of cards may be inserted into a same SIM card interface 995. Types of the plurality of cards may be same or different. The SIM card interface 995 may be compatible with different types of SIM cards. The SIM card interface 995 may also be compatible with an external storage card. The electronic device 900 interacts with a network by using the SIM card, so as to implement functions such as a call and data communication. In some embodiments, the electronic device 900 uses an eSIM, that is, an embedded SIM card. The eSIM card may be embedded in the electronic device 900, and cannot be separated from the electronic device 900.

A software system of a terminal device 100 may use a layered architecture, an event-driven architecture, a microkernel architecture, a microservice architecture, or a cloud architecture. In embodiments of this application, an Android system with a layered architecture is used as an example to describe a software structure of the terminal device 100.

Figure 10:
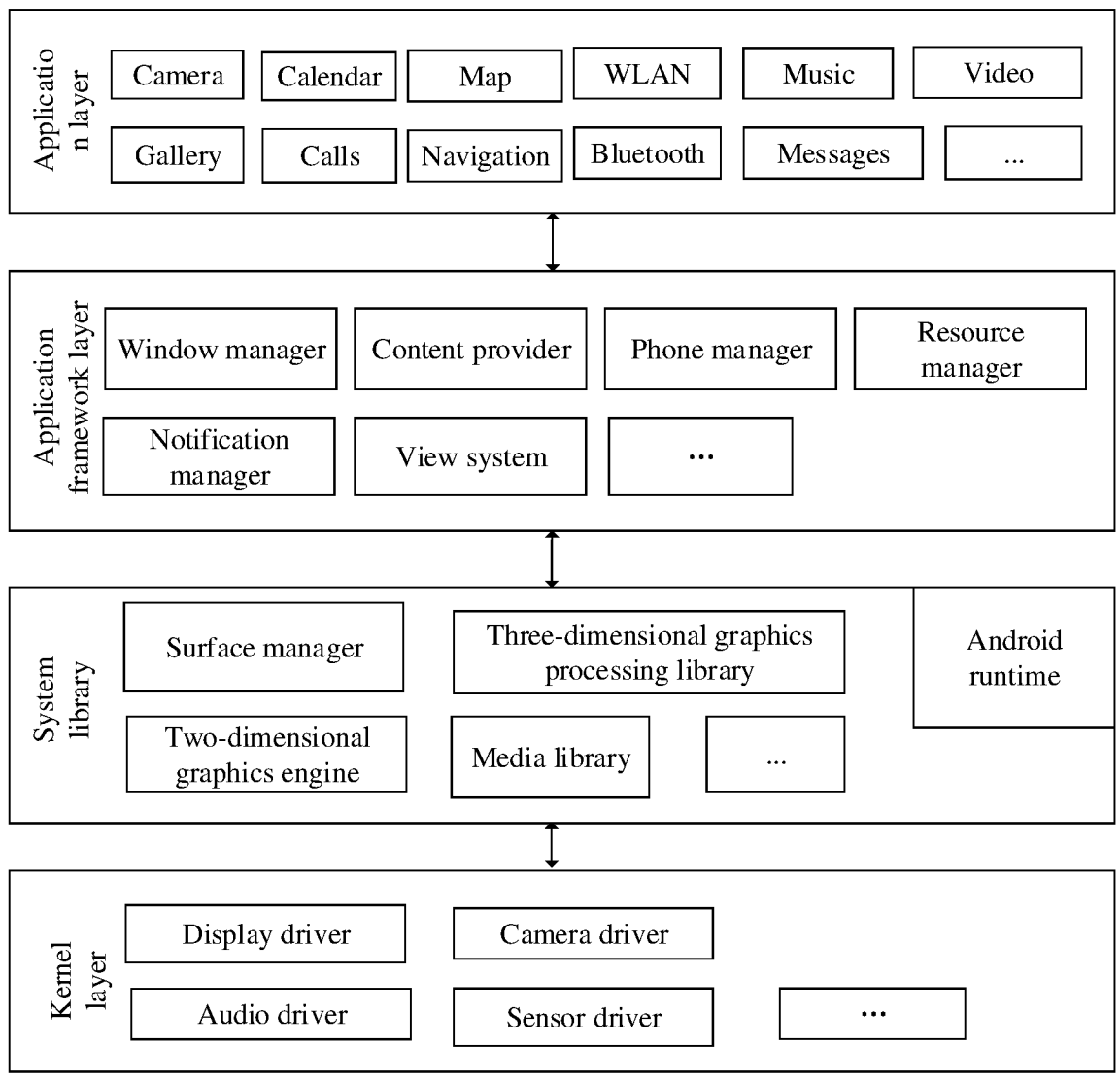
FIG. 10 is a schematic block diagram of a software structure of a terminal device 900 according to an embodiment of this application.

FIG. 10 is a schematic block diagram of a software structure of a terminal device 900 according to an embodiment of this application.

In the layered architecture, software is divided into several layers, and each layer has a clear role and task. Layers communicate with each other by using software interfaces. In some embodiments, the Android system is divided into four layers: an application layer, an application framework layer, an Android runtime (Android runtime) and a system library, and a core layer.

The application layer may include a series of application packages.

As shown in FIG. 10, the application packages may include applications such as Camera, Gallery, Calendar, Calls, Maps, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 10, the application framework layer may include a window manager, a content provider, a view system, a phone manager, a resource manager, a notification manager, and the like.

The window manager is used to manage window programs. The window manager may obtain a size of a display, determine whether there is a status bar, lock a screen, take a screenshot, and the like.

The content provider is used to store and obtain data and make the data accessible to an application. The data may include a video, an image, audio, calls that are made and received, browsing history and bookmarks, a phonebook, and the like.

The view system includes visual controls, such as a control for displaying text, a control for displaying pictures, and the like. The view system may be used to construct an application. A display interface may include one or more views. For example, a display interface including a message notification icon may include a view for displaying text and a view for displaying pictures.

The telephone manager is used to provide a communication function of the terminal device 900, for example, call status management (including answering, declining, or the like).

The resource manager provides various resources for the application, such as a localized string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is used to notify download completion, message reminder, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the terminal device vibrates, or an indicator light blinks.

The Android Runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run in the virtual machine. The virtual machine executes java files at the application layer and the application framework layer as binary files. The virtual machine is used to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording in various commonly used audio and video formats, still image files, and the like. The media library may support a plurality of audio and video coding formats, such as: MPEG4, H.1064, MP3, AAC, AMR, JPG, PNG, and the like.

The three-dimensional graphics processing library is used to implement three-dimensional graphics drawing, image rendering, composition, layer processing, and the like.

The 2D graphics engine is a drawing engine for 10D drawing.

The kernel layer is a layer between hardware and software. The kernel layer includes at least a display driver, a camera driver, an audio driver, and a sensor driver.

An embodiment of this application further provides a computer-readable storage medium. The computer-readable storage medium stores a computer program. When the computer program is executed by a processor, steps in the embodiments in the foregoing communication service status control method can be implemented.

An embodiment of this application provides a computer program product. When the computer program product runs on a terminal device, steps in the embodiments in the foregoing communication service status control method can be implemented.

An embodiment of this application further provides a chip system. The chip system includes a processor, where the processor is coupled to a memory, and the processor executes a computer program stored in the memory, so as to implement steps in the foregoing embodiments of the communication service status control method. The chip system may be a single chip or a chip module including a plurality of chips.

In the foregoing embodiments, description of each embodiment has its own focus. For a part that is not described or recorded in detail in an embodiment, reference may be made to related descriptions in another embodiment. It should be understood that a sequence number of each step in the foregoing embodiments does not mean a sequence of execution, and should not constitute any limitation on an implementation process of the embodiments of this application. An execution sequence of each process should be determined by its function and internal logic. In addition, in descriptions of the specification of this application and the appended claims, terms such as "first", "second", "third" are merely used to distinguish descriptions, and cannot be understood as indicating or implying relative importance. Reference to "one embodiment", "some embodiments", or the like described in the specification of this application means that one or more embodiments of this application include a specific feature, structure, or feature described with reference to the embodiments. Therefore, statements such as "in one embodiment", "in some embodiments", "in some other embodiments" that appear in different parts of this specification do not necessarily refer to same embodiments, but mean "one or more but not all embodiments" unless otherwise specifically emphasized.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a first terminal device, wherein the method comprises:
when it is detected that a preset trigger condition is met, enabling a first communication service corresponding to a target service, and displaying a status of a switch control of the first communication service as a first state, wherein the first communication service is a communication service required for implementing the target service, and the first state describes that the first communication service is in an enabled state; and
when a first operation for the switch control is detected and it is detected that the target service is in a running state, in response to the first operation, displaying a status of a switch control of a second communication service as a second state, and maintaining the second communication service in an enabled state, wherein the first operation indicates to disable the second communication service, the second communication service is one or more communication services in the first communication service, and the second state describes that the second communication service is in a disabled state.

2. The method according to claim 1, wherein the first communication service comprises at least one of the following: Bluetooth, Wi-Fi, and near field communication (NFC).

3. The method according to claim 2, wherein the detecting that a preset trigger condition is met comprises:
detecting whether there is a touch with a second terminal device; and
when a touch with the second terminal device is detected, determining that the preset trigger condition is met.

4. The method according to claim 2, further comprising:
when it is detected that the target service is not in a running state, disabling the first communication service.

5. The method according to claim 1, wherein the detecting that a preset trigger condition is met comprises:
detecting whether there is a touch with a second terminal device; and
when a touch with the second terminal device is detected, determining that the preset trigger condition is met.

6. The method according to claim 5, wherein the enabling a first communication service corresponding to a target service comprises:
obtaining device information of the second terminal device through a communication channel, wherein the communication channel is a connection channel between the first terminal device and the second terminal device;
determining the target service based on the device information;
determining the first communication service associated with the target service; and
enabling the first communication service.

7. The method according to claim 6, further comprising:
when it is detected that the target service is not in a running state, disabling the first communication service.

8. The method according to claim 5, wherein the detecting whether there is a touch with a second terminal device comprises:
detecting a distance from the second terminal device;
when the distance is less than a preset distance, enabling near field communication (NFC) to generate an NFC radio frequency field;
detecting residence time of an NFC tag in the NFC radio frequency field, wherein the second terminal device comprises the NFC tag; and
when the residence time is longer than a preset time threshold, determining that there is a touch with the second terminal device.

9. The method according to claim 8, wherein the enabling a first communication service corresponding to a target service comprises:
obtaining device information of the second terminal device through a communication channel, wherein the communication channel is a connection channel between the first terminal device and the second terminal device;
determining the target service based on the device information;

determining the first communication service associated with the target service; and enabling the first communication service.

10. The method according to claim 8, further comprising:
when it is detected that the target service is not in a running state, disabling the first communication service.

11. The method according to claim 1, wherein the detecting that a preset trigger condition is met comprises:
when a second operation is detected, determining that the preset trigger condition is met, wherein the second operation is used to trigger the target service.

12. The method according to claim 1, further comprising:
when it is detected that the target service is not in a running state, disabling the first communication service.

13. The method according to claim 1, further comprising:
displaying a first interface when the target service is triggered for a first time, wherein the first interface comprises prompt information, and the prompt information is used to prompt a user whether to keep a communication service in an enabled state when a switch control is in the second state.

14. The method according to claim 1, further comprising:
in response to the first operation, after displaying a status of a switch control of a second communication service as a second state, and maintaining the second communication service in an enabled state when it is detected that the target service is ended, the second communication service is automatically disabled.

15. The method according to claim 1, further comprising:
in response to the first operation, after displaying a status of a switch control of a second communication service as a second state, and maintaining the second communication service in an enabled state, and when a third operation is detected, the second communication service is automatically disabled, wherein the third operation indicates to disable the target service.

16. The method according to claim 1, further comprising:
when a fourth operation for a first service is detected and it is detected that the target service is in a running state, in response to the fourth operation, displaying a status of a switch control of a third communication service as a second state, and maintaining the third communication service in an enabled state, wherein the fourth operation indicates to disable the first service, the third communication service is a communication service shared by the first service and the target service, and the second state describes that the third communication service is in a disabled state.

17. The method according to claim 1, wherein when target service starts, registration is performed in a registration service list, to register a corresponding service into the registration service list, and carry a corresponding communication service label.

18. The method according to claim 17, wherein when the target service is disabled, that which communication services need to be disabled is determined by the communication service label in the registration service list, and the corresponding communication service is automatically disabled.

19. A terminal device, comprising a memory, a processor, and a computer program that is stored in the memory and can run on the processor, wherein the processor implements:
when it is detected that a preset trigger condition is met, enabling a first communication service corresponding to a target service, and displaying a status of a switch control of the first communication service as a first state, wherein the first communication service is a communication service required for implementing the target service, and the first state describes that the first communication service is in an enabled state; and when a first operation for the switch control is detected and it is detected that the target service is in a running state, in response to the first operation, displaying a status of a switch control of a second communication service as a second state, and maintaining the second communication service in an enabled state, wherein the first operation indicates to disable the second communication service, the second communication service is one or more communication services in the first communication service, and the second state describes that the second communication service is in a disabled state.

20. A non-transitory computer-readable storage medium, wherein the non-transitory computer-readable storage medium stores a computer program, when the computer program is executed by a processor, an apparatus is caused to:
when it is detected that a preset trigger condition is met, enable a first communication service corresponding to a target service, and display a status of a switch control of the first communication service as a first state, wherein the first communication service is a communication service required for implementing the target service, and the first state describes that the first communication service is in an enabled state; and when a first operation for the switch control is detected and it is detected that the target service is in a running state, in response to the first operation, display a status of a switch control of a second communication service as a second state, and maintain the second communication service in an enabled state, wherein the first operation indicates to disable the second communication service, the second communication service is one or more communication services in the first communication service, and the second state describes that the second communication service is in a disabled state.

* * * * *